(12) United States Patent
Larimer

(10) Patent No.: US 12,270,776 B2
(45) Date of Patent: Apr. 8, 2025

(54) APPARATUS AND METHOD FOR CRACK MEASUREMENT

(71) Applicant: United States Department of Energy, Washington, DC (US)

(72) Inventor: Joshua T. Larimer, McMurray, PA (US)

(73) Assignee: U.S. Department of Energy, Washington, DC (US)

( * ) Notice: Subject to any disclaimer, the term of this patent is extended or adjusted under 35 U.S.C. 154(b) by 169 days.

(21) Appl. No.: 18/106,777

(22) Filed: Feb. 7, 2023

(65) Prior Publication Data

US 2023/0251220 A1    Aug. 10, 2023

Related U.S. Application Data

(60) Provisional application No. 63/308,097, filed on Feb. 9, 2022.

(51) Int. Cl.
*G01N 27/20* (2006.01)
*G01N 27/04* (2006.01)

(52) U.S. Cl.
CPC .......... *G01N 27/20* (2013.01); *G01N 27/041* (2013.01)

(58) Field of Classification Search
CPC ............................. G01N 27/20; G01N 27/041
USPC ........................................ 324/691, 649, 600
See application file for complete search history.

(56) References Cited

U.S. PATENT DOCUMENTS

| | | | |
|---|---|---|---|
| 7,857,506 B2* | 12/2010 | Schick | G01N 27/10 |
| | | | 324/705 |
| 10,983,081 B2* | 4/2021 | Redinger | G01N 27/045 |
| 2005/0189936 A1* | 9/2005 | Quackenbush | G01D 18/00 |
| | | | 324/750.02 |
| 2020/0249189 A1* | 8/2020 | Wang | G01R 27/02 |
| 2021/0025808 A1* | 1/2021 | Al-Abbas | G01N 33/383 |
| 2022/0373493 A1* | 11/2022 | Lee | H01M 10/4285 |

* cited by examiner

*Primary Examiner* — Giovanni Astacio-Oquendo
(74) *Attorney, Agent, or Firm* — Robert T. Burns; Jonathan Parthum; Jennifer R. Mahalingappa

(57) ABSTRACT

Disclosed is an apparatus and method for crack measurement, including the steps of placing a plurality of sense leads on a surface of an object, passing a current through the object, sensing a change in electric potential in the interior of the object, and forming a crack profile of the interior of the object based on the sensed change in electric potential.

20 Claims, 8 Drawing Sheets

APPARATUS AND METHOD FOR CRACK MEASUREMENT

CLAIM TO PRIORITY

This application claims priority to U.S. Provisional Patent Application Ser. No. 63/308,097 filed Feb. 9, 2022, the entirety of which is herein incorporated by reference.

NOTICE OF GOVERNMENT RIGHTS

The United States Government has rights in this application and any resultant patents claiming priority to this application pursuant to Contract No. 89233018CNR000004 between the United States Department of Energy and Fluor Marine Propulsion, LLC.

FIELD

The present subject matter relates to non-destructive crack measurement. More particularly, the present subject matter relates to non-destructive crack measurement by sensing changes in electric potential.

BACKGROUND

Conventional electric potential change probes (commonly referred to as electric potential drop probes or EPD probes) cannot be moved to measure crack depths, as doing so would invalidate the data. They use sensor leads that must be tack-welded to the surface of a crack mouth/opening, which means they can only measure crack depths at a fixed location. If the crack cannot be seen from the surface, conventional EPD sensor fixed leads must be welded in the approximate crack location using a guess and check method. If the leads are not welded in the correct location, the leads and the tack welds must be removed and then rewelded to another location so the fixed-lead measurement process can be repeated at the other location. A need exists for methods and apparatuses for crack measurement using movable leads, and for methods and apparatuses that can generate a crack profile rather than crack depth measurement at a single point.

SUMMARY

Certain exemplary embodiments of the present subject matter include a probe having a mount configured to mate with a surface of an object, a plurality of holes extending through the mount, and a plurality of sense leads extending through the plurality of holes and configured to make contact with the surface of the object. In certain exemplary embodiments, the plurality of sense leads are configured to maintain contact with the surface of the object, and certain other exemplary embodiments include a sensor electrically connected to the plurality of sense leads and configured to detect a change in electric potential. The sensor is configured to detect a change in electric potential in an interior of the object.

Certain exemplary embodiments disclose a method of measuring an interior of an object which includes the steps of placing a plurality of sense leads on a surface of the object, passing a current through the object, sensing a change in electric potential in the interior of the object, and forming a crack profile of the interior of the object based on the sensed change in electric potential. Certain exemplary methods further include moving the plurality of sense leads to multiple positions across the surface of the object, recording a plurality of sense lead positions, sensing a plurality of changes in electric potential in the interior of the object, and forming the crack profile based on the plurality of sensed changes in electric potential. In certain embodiments the plurality of sensed changes in electric potential are correlated with the plurality of recorded sense lead positions.

BRIEF DESCRIPTION OF THE FIGURES

A description of the present subject matter including various embodiments thereof is presented with reference to the accompanying drawings, the descriptions not intended to be considered limiting in any matter, wherein.

DETAILED DESCRIPTION

Figure 1:
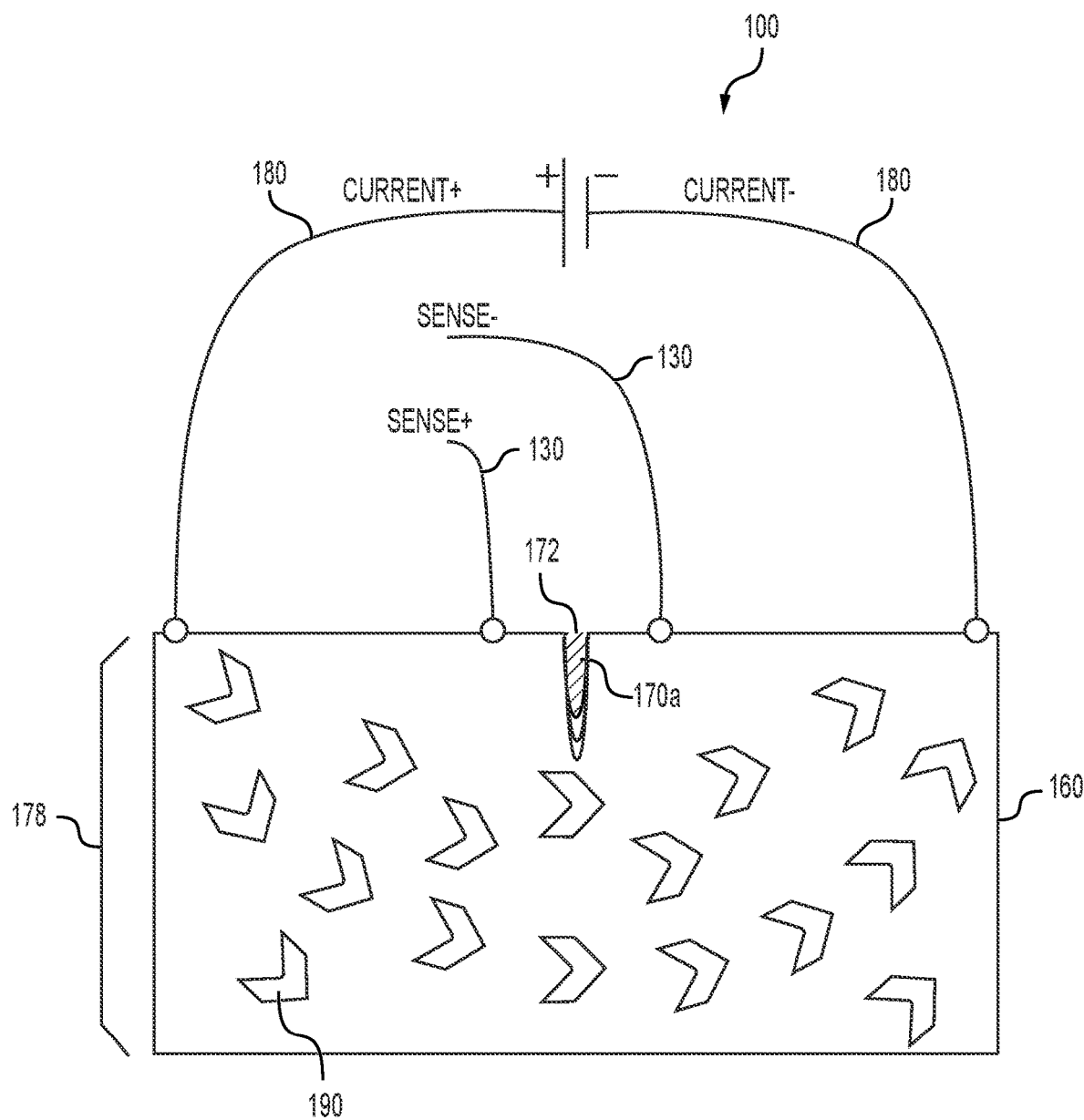
FIG. 1 illustrates a schematic of a conventional EPD system.

FIG. 1 illustrates a schematic of a conventional EPD sensor 100. As shown in FIG. 1, sense leads 130 are placed directly across a visible crack opening 172 of a crack 170 in a measured object 160, with electric current 180 flowing in object 160 represented by vectors 190. As the crack 170 grows deeper through a measured object 160, the cross-sectional area (A) 178 available for current flow decreases. A decrease in cross sectional area (A) 178 results in increased resistance (R) when resistivity ($\rho$) and length (l) remain constant according to the resistance equation: $R=\rho l/A$. That increase in resistance results in increased voltage across the sense leads 130 according to Ohm's Law. Therefore, as the crack 170 in the measured object 160 grows larger, voltage increases while current remains constant.

FIGS. 2A-2H illustrate an exemplary embodiment of an EPD sensor 200 in accordance with the present subject matter. The exemplary EPD sensor 200 is configured to measure crack depth in an objects 260 having at least one exterior or interior crack 270a/270b (or, if generally referring to a crack without specifying its location, at least one crack 270). EPD sensor 200 can also be used where cracking occurs in an inaccessible area (due to space constraints or environment) and is suitable for measurements where sense leads cannot be welded to the surface of an object. In addition to measuring exterior cracks 270a, the exemplary embodiment shown performs crack depth measurement of interior cracks 270b of object 260.

Unlike conventional EPD system 100, the exemplary EPD system 200 of FIGS. 2A-2H is movable (i.e., it has no fixed mechanical connection to a measured object), which allows access for other crack inspection techniques (e.g., ultrasonic inspections) and for measuring other objects (not shown) without having to break welds and/or some other fixed mechanical connection between test leads and a measured object. Because probe 220 is moveable, the embodiment shown also provides for crack profile measurement, rather than only measuring crack depth at a single location as with conventional EPD sensors 100. Thus, in addition to being able to measure exterior cracks 270a, the exemplary embodiment shown is also configured to measure interior cracks 270*b* (i.e., cracks that start below and are not visible from surface 261 of a measured object 260), and/or form a crack profile (see, e.g., FIG. 4) using movable sense leads 230.

Figure 2A:
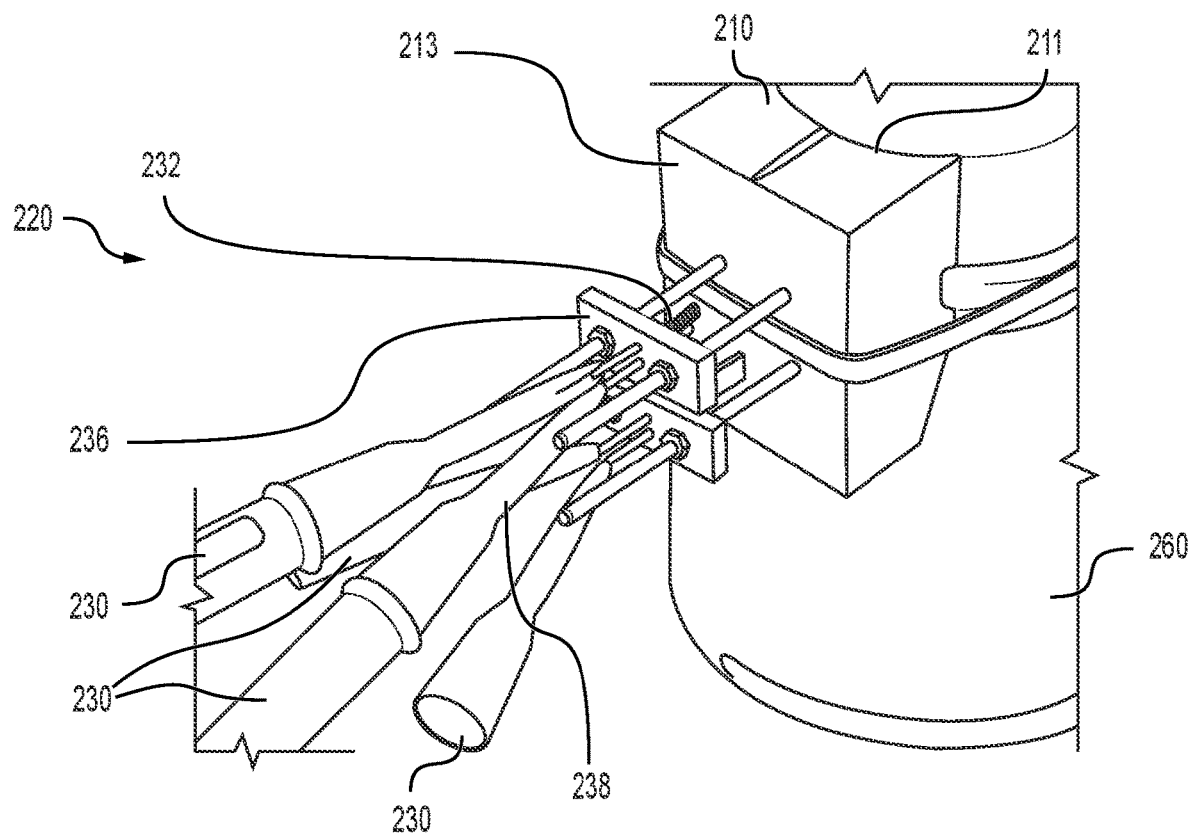
FIGS. 2A-2H illustrate an exemplary embodiment of an EPD system in accordance with the present subject matter.
Figure 2B:
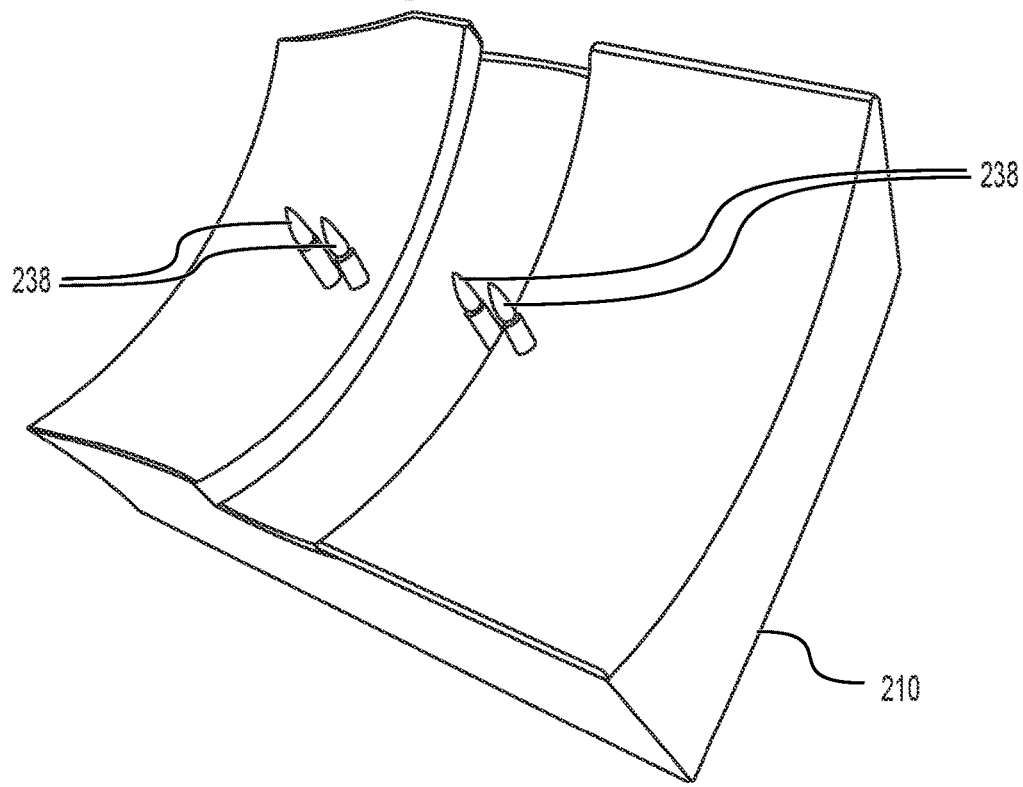
Figure 2C:
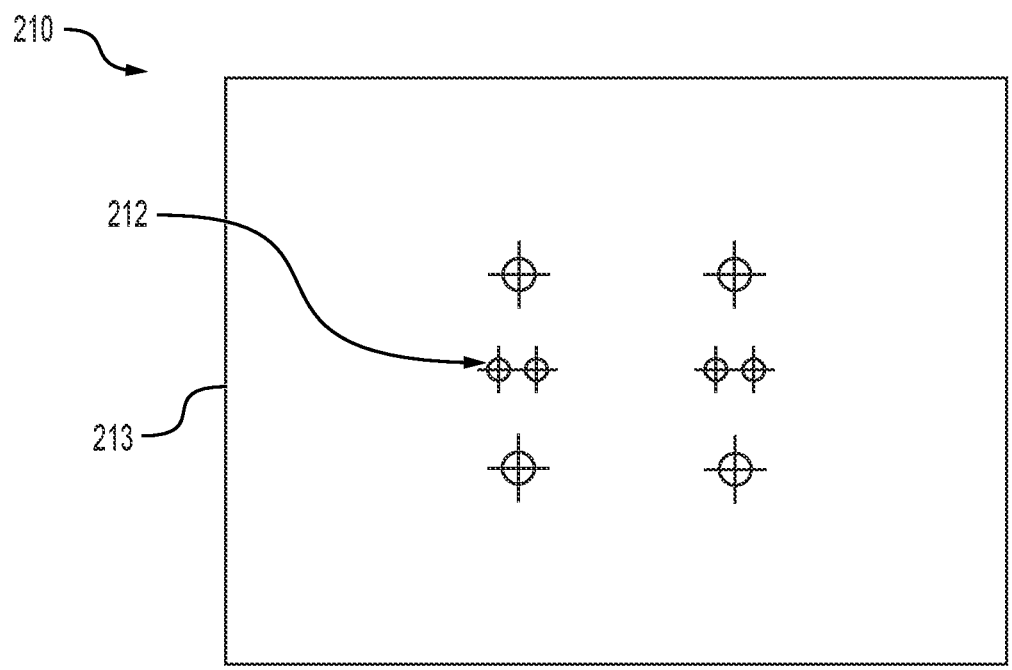
Figure 2D:
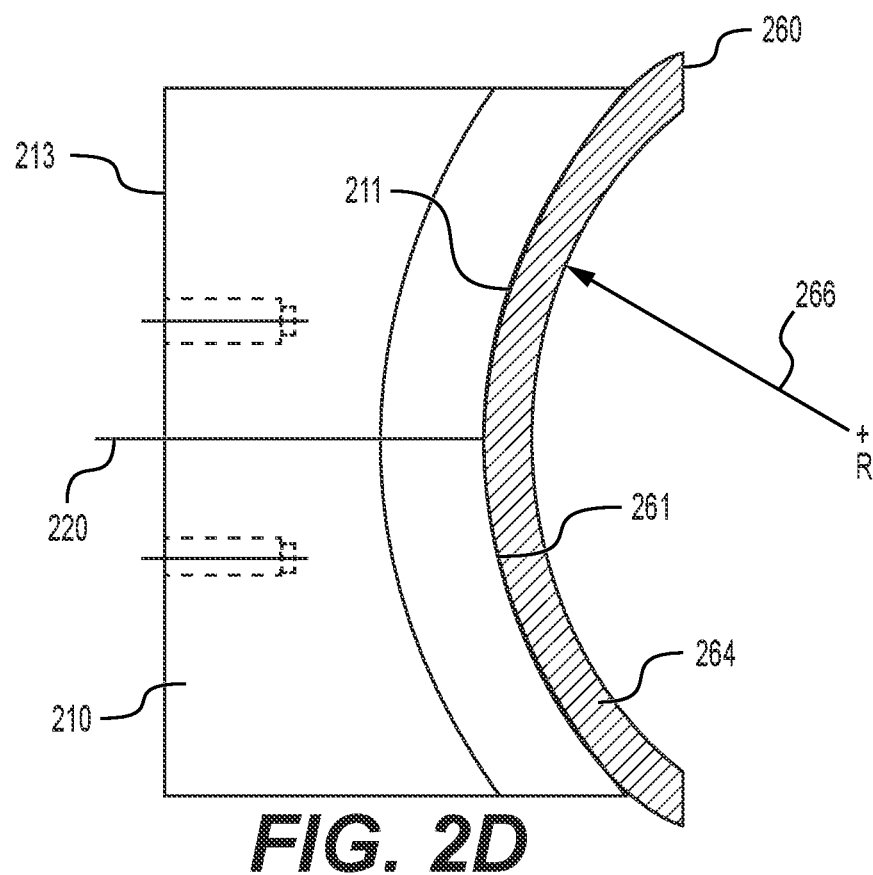
Figure 2E:
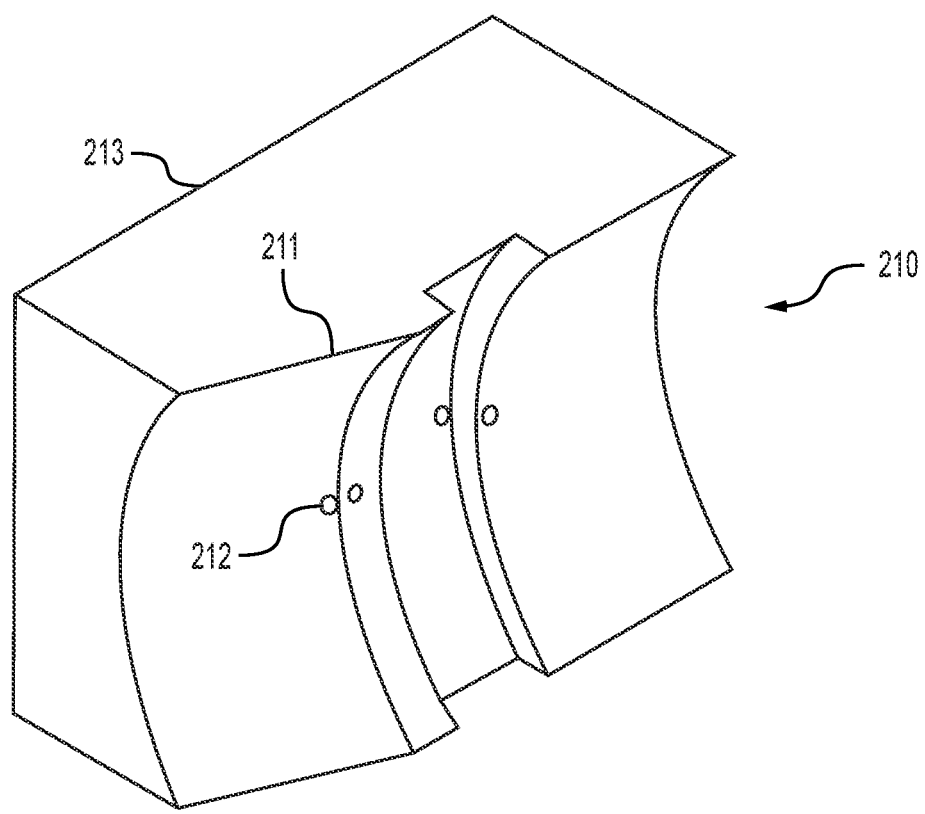
Figure 2F:
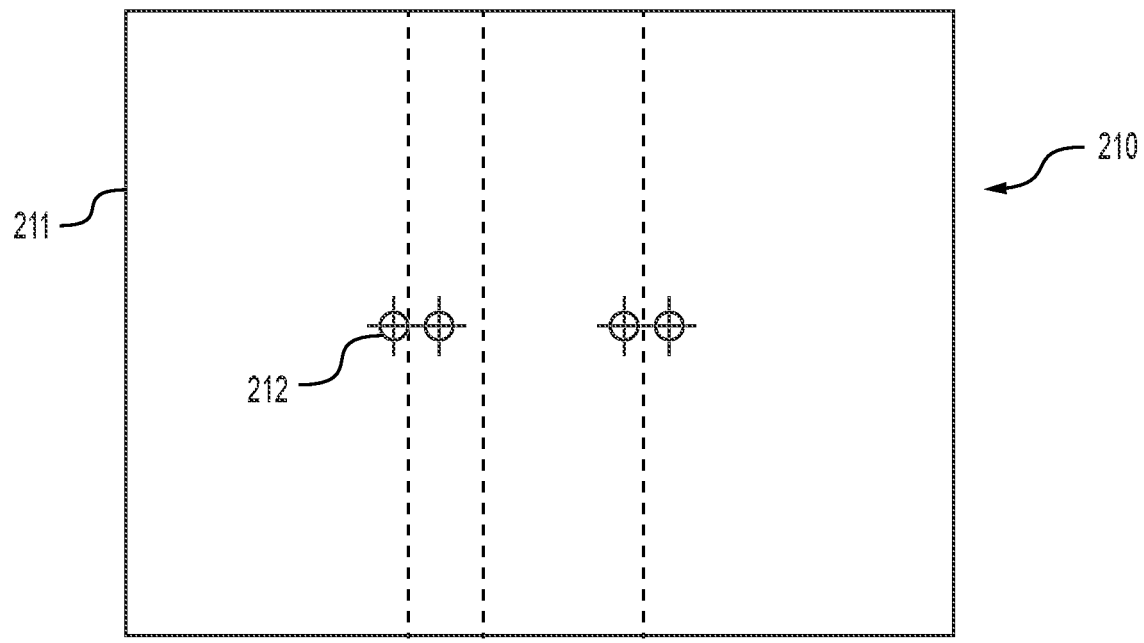
Figure 2G:
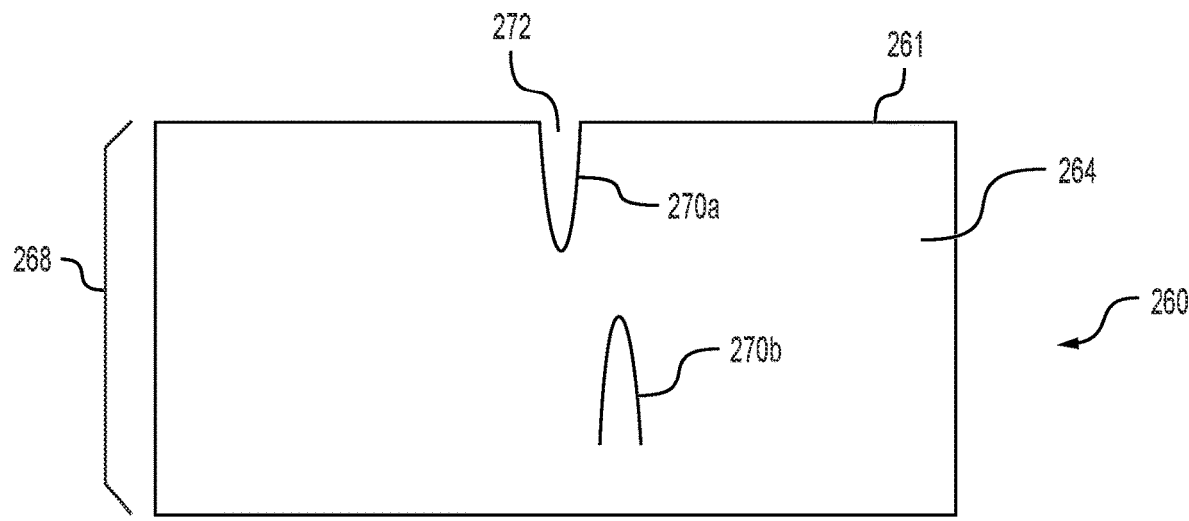
Figure 2H:
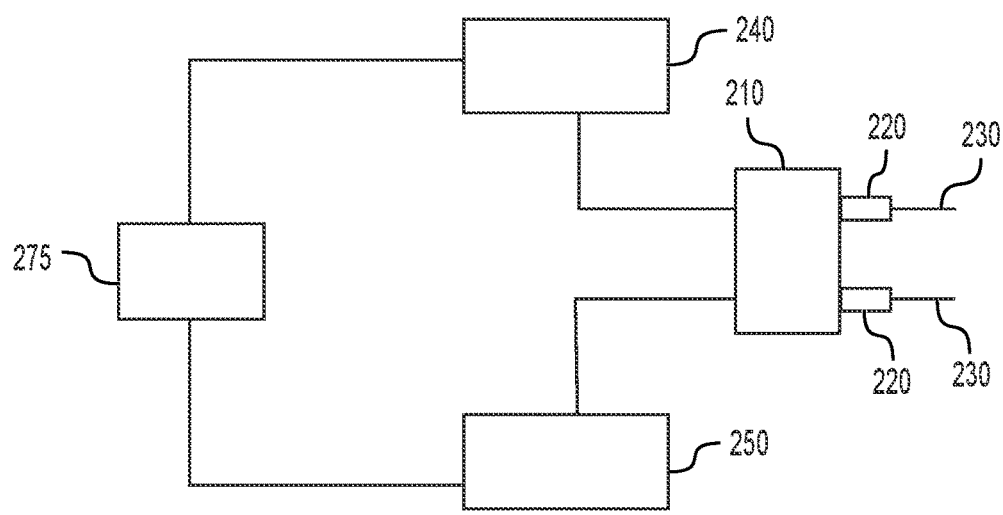

FIG. 2H illustrates an exemplary functional block diagram of an EPD system 200. EPD system 200 includes a mount 210, probe 220, at least two sense leads 230, a sensor 240, a position indicator 250, and a crack profile generator 275. Sensor 240 can be any device capable of detecting a change in electric potential, such as a voltmeter, a multimeter, or any other electric potential sensing device known to those of skill in the art. Position indicator 250 can be any device known to those of skill in the art that is capable of indicating one or more of the absolute position of the object (its location) or its relative position (displacement) in terms of linear travel, rotational angle or three-dimensional space.

Crack profile generator 275 is a general-purpose computer which optionally includes at least one processor (not shown) as a hardware device for executing software stored in a non-transitory computer-readable medium. The processor can be any custom made or commercially available processor, a central processing unit (CPU), an auxiliary processor among several processors associated with crack profile generator 275, a semiconductor based microprocessor (in the form of a microchip or chip set, for example), a macro processor, or generally any device for executing software instructions. In certain exemplary embodiments, the memory can have a distributed architecture, where various components are situated remote from one another. The processor is configured to execute software stored within the memory, to communicate data to and from the memory, and to generally control operations of the computer pursuant to the software. When the systems and methods described herein are implemented in software, the methods are stored on any non-transitory computer readable medium for use by or in connection with any computer related system or method. In the context of this document, a non-transitory computer readable medium is an electronic, magnetic, optical, or other physical device or means that can contain or store a computer program for use by or in connection with a computer related system or method. The software in the non-transitory computer-readable medium may include one or more separate programs, and may be in the form of a source program, executable program (object code), script, or any other entity comprising a set of instructions to be performed.

In certain embodiments, precision drilled holes 212 are placed in the probe mount 210 to increase placement accuracy of one or more sense leads 230 in contact with measured object 260. In the exemplary embodiment shown, sense leads 230 include probe tips 238. These tips 238 can, but need not be, multimeter tips. Other tips known to those of skill in the art can be used without departing from the scope of the present subject matter. In certain embodiments, mount 210 is shaped to match an object contour 266 (see, e.g., FIGS. 2A and 2D). In certain exemplary embodiments, mount 210 is fabricated through a process such as 3D printing using plastic as the material. This exemplary material provides for rapid production of mounts 210 for probe 220. In the exemplary embodiments of FIGS. 2A-2H, mount 210 is electrically insulated from object 260, such that current passes into object 260, but not mount 210. In certain exemplary embodiments, mount 210 is made from non-conductive additive manufacturing material or materials. The shape of mount 210 shown in FIGS. 2A-2H is exemplary only, as other shapes can be used (alone or in combination) without departing from the scope of the present subject matter. Mount 210 can be shaped to fit any object contour 266. In certain embodiments, mount 210 includes precision drilled holes 212 to increase placement accuracy of one or more sense leads 230 in contact with measured object 260.

In the exemplary embodiment shown, mount 210 is in contact on a first side 211 with the surface 261 of a measured object 260 and is in contact on a second side 213 with probe 220. The exemplary probe 220 shown enables highly accurate and repeatable placement of one or more sense leads 230 on object 260 using an additively manufactured (plastic rapid prototype printing) mount 210. Certain exemplary embodiments include a tensioning mechanism 232 configured to maintain sense leads 230 in electrical contact with the surface 261 of object 260 (see, e.g., FIGS. 2A and 2D). In certain embodiments tensioning mechanism 232 is one or more springs, but other tensioning mechanisms known to those of skill in the art can be used in place of or in addition to springs without departing from the scope of the present subject matter.

In certain embodiments, at least two sense leads 230 are maintained in electrical contact with the object surface 261. In the exemplary embodiment shown, the sense leads 230 are Fluke 2 mm (0.080") piercing needle non-destructive test probe leads, with the tensioning mechanism including at least one spring (which can, but need not be, a McMaster Carr #8969T105). Certain other exemplary embodiments optionally include a guide plate 236 (which in this exemplary embodiment is made at least in part using 3D printed rapid prototype plastic). Other materials and methods (in place of and/or in addition to the method and material discussed here) can be used to make guide plate 236 without departing from the scope of the present subject matter.

In the exemplary embodiment of FIGS. 2A-2H, mount 210 and probe 220 are movable around object 260 (and in certain exemplary embodiments are circumferentially movable around object 260). With the freedom to move probe 220 around object 260, crack profiles 476*a*/476*b*/476*c* (see, e.g., FIG. 4) can be measured (in certain embodiments continuously), with respect to position on object 260. Due to the removable nature of probe 220, other crack monitoring/ investigation techniques (e.g., ultrasonic inspection) can also be completed in parallel with crack measurement. Conventional EPD crack depth measurement techniques cannot do this, as they require their leads to be immovably connected through tack welding or some other method of affixing leads to the object that hamper the ability to complete other types of crack inspections.

Figure 3:
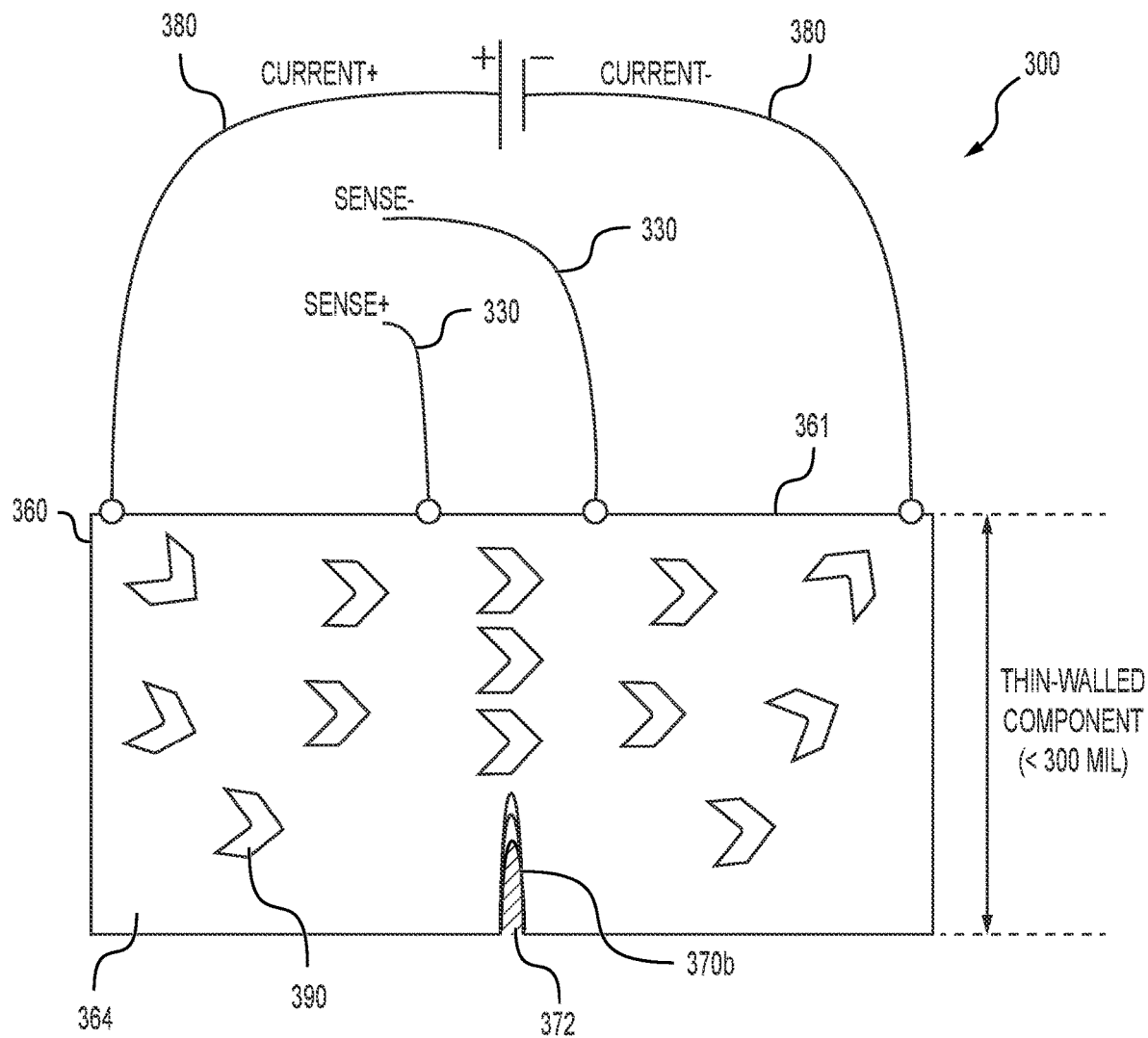
FIG. 3 illustrates a schematic of an exemplary embodiment of an EPD system in accordance with the present subject matter.

FIG. 3 illustrates a schematic of an exemplary embodiment of an EPD probe crack depth measurement system 300 in accordance with the present subject matter. The EPD 300 of FIG. 3 can be used to monitor crack depth in an object 360 having exterior cracks 370*a* (not shown), interior cracks 370*b*, or both. Conventional EPD crack depth measurement techniques, in contrast are only capable of measuring exterior cracks (see, for example 170*a* in FIG. 1) (via sense leads 130 tack welded across crack opening 172). In the embodiment shown, sense leads 330 are placed on the surface 361 opposite a crack opening 372, with electric current 380 flowing in object 360 represented by vectors 390. Unlike conventional EPDs 100, EPD systems 300 in accordance with the present subject matter include sense leads 330 configured to be placeable in the vicinity of crack mouth/ opening 372 instead of directly across the mouth/opening 372 (e.g., for interior crack monitoring). In the exemplary embodiment shown, interior cracks 370*b* are detectable below the surface 361 of the measured object 360. In the example shown, the EPD system 300 detected interior cracks 370b up to 300 mils below surface 361. Although not shown, EPD system 300 can also detect exterior cracks, in place of or in addition to interior cracks.

Figure 4:
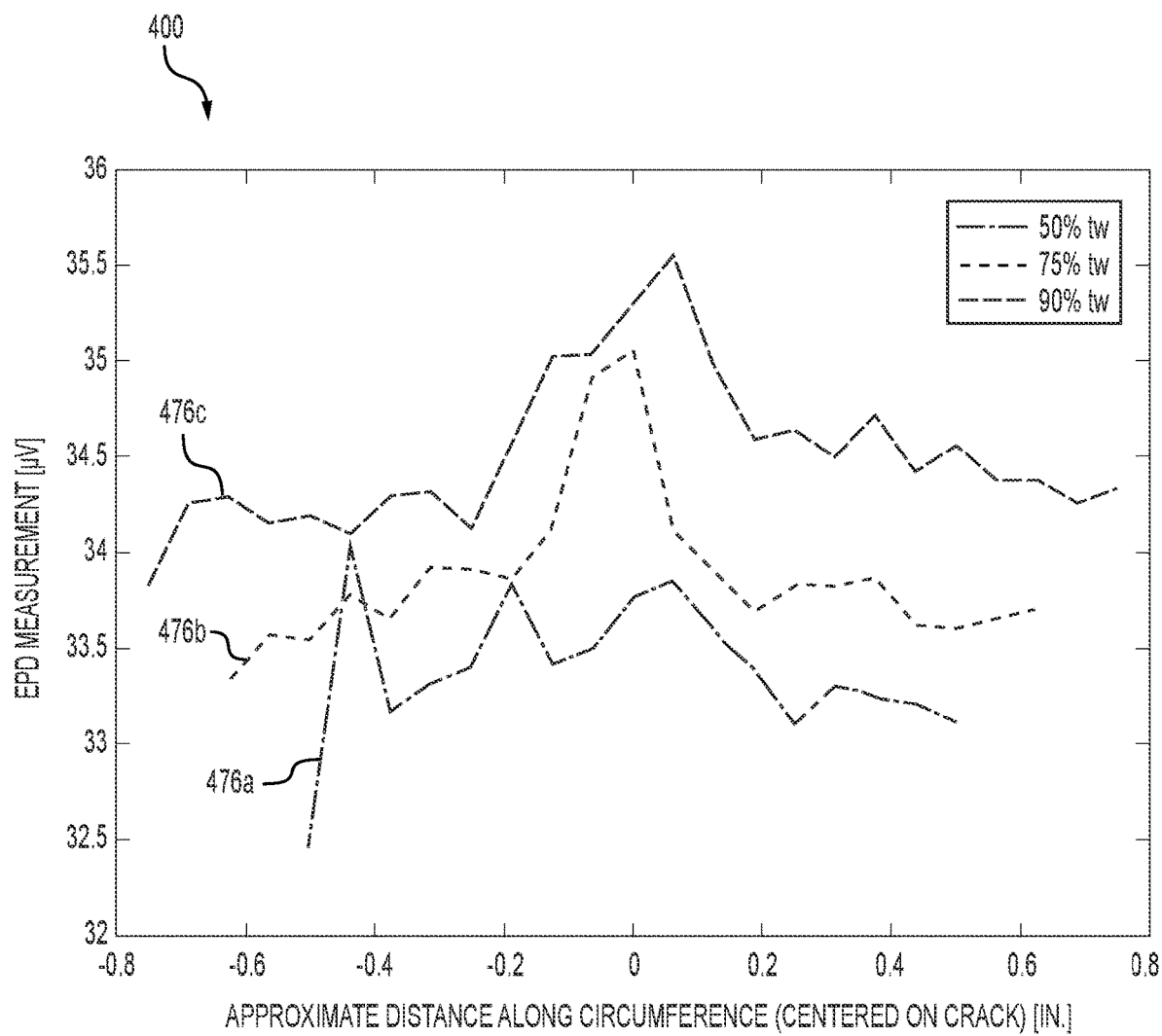
FIG. 4 illustrates an exemplary graph of EPD crack profiles.

FIG. 4 illustrates an exemplary graph of EPD crack profiles 400. In certain exemplary embodiments, one or more crack profiles were developed through modeling and/or testing using one or more finite element analysis models for one or more cracks of different/varying crack depths and using these points to produce at least one crack profile. In certain exemplary embodiments, the analysis was performed using at least one Abaqus finite element analysis model for varying crack depth to generate simulated EPD measurements of these crack depths to generate (x,y) points to form one or more crack profiles. This model is exemplary only, as other analysis models known to those of skill in the art can be used without departing from the scope of the present subject matter.

In the exemplary profiles of FIG. 4, cracks of varying through-wall depths (50%, 75%, and 90%) were measured using an EPD system 300. Specifically, the exemplary profiles 476a/476b/476c of FIG. 4 were generated by measuring artificially inserted cracks of known depths. In certain exemplary embodiments, EPD system 300 measured crack depths in-situ while other tests or experiments were concurrently performed (for example on object 360). In certain embodiments, an exemplary EPD system 300 took measurements at 50 mil increments from a crack centerline along the circumference of an elliptically shaped crack (see, e.g., FIG. 3). Other increments could be used, in place of or in addition to 50 mil increments, without departing from the scope of the present subject matter. In this exemplary embodiment, EPD system 300 measurements were taken at one or more of these increments by scanning a crack and taking point measurements at varying locations of the crack that would have different through-wall depths per the elliptical shape of the crack. In the exemplary plots of FIG. 4, the information obtained was combined with positional information of each EPD system 300 measurement to form profiles 476a/476b/476c. In these exemplary plots the crack profiles formed elliptical shapes, with the maximum EPD readings for each crack obtained at the centerline of the crack (i.e., there were higher EPD readings obtained for deeper cracks). It was also discovered that increasing the current used to obtain the measurements resulted in higher resolution profile data. In other exemplary embodiments, an encoder ring was used to obtain more precise positional data. In the exemplary test results shown, the crack profiles 476a/476b/476c are shown in successive tests of increasing through-wall depths. In the measurements shown in FIG. 4, the crack 370b is internal to object 360, with crack depth measurement locations obtained using movable equipment that obtained crack profiles 476a/476b/476c (not just crack depth at one point). The profiles and crack depths shown in FIG. 4 are exemplary only, as depths at other measurements at other locations can also be performed without departing from the scope of the present subject matter.

Figure 5:
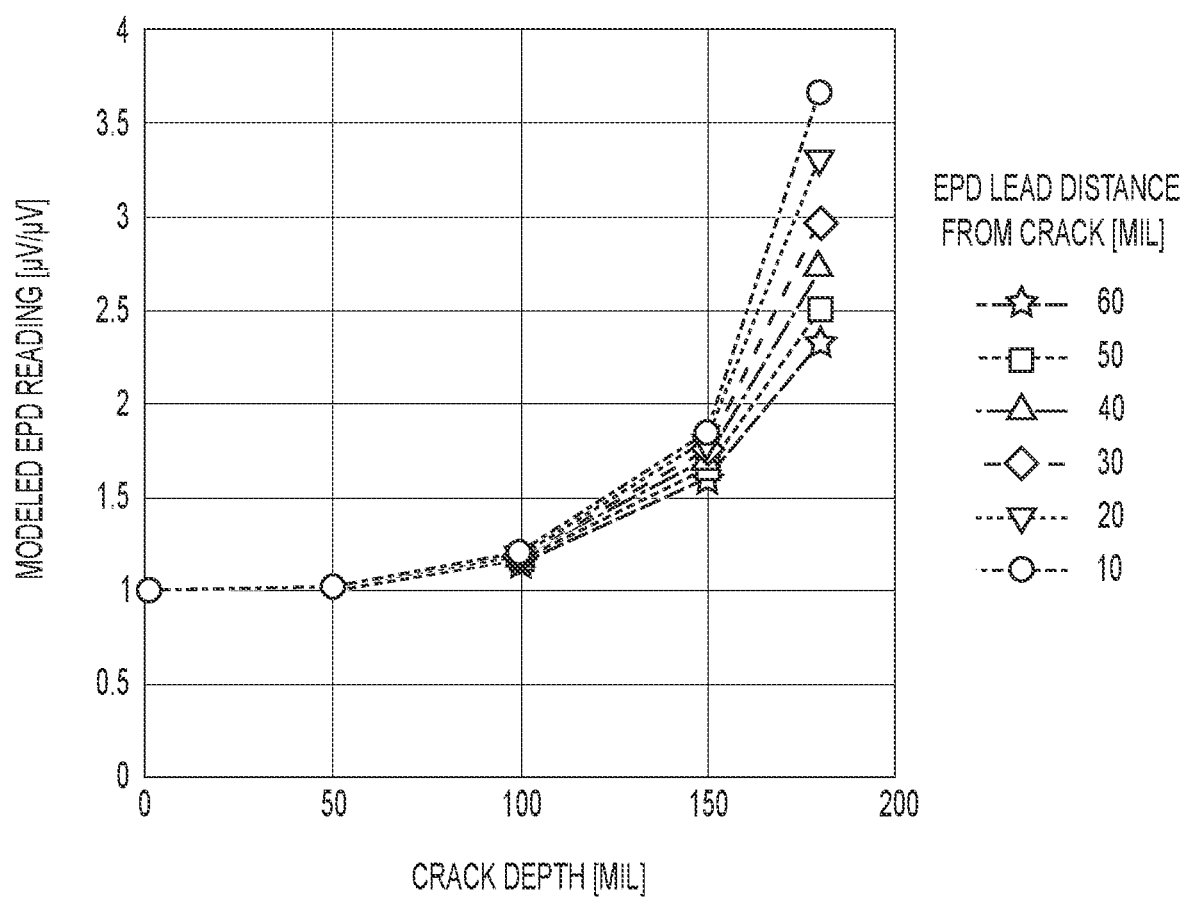
FIG. 5 illustrates an exemplary graph of crack profile models.

FIG. 5 illustrates an exemplary graph of crack profile models for an EPD probe (not shown). In this figure, the values on the y-axis use normalized values of modeled current divided by current readings obtained at 0 mil crack depth, and the values on the x-axis were modeled using one amp of current to measure internal cracks of different depths at distances of 10 to 60 mils below the surface of an object. These values are exemplary only, as other values for current, crack depth, and crack distance can be used instead of or in addition to the values shown without departing from the scope of the present subject matter.

It will be understood that many additional changes in the details, materials, steps, and arrangement of parts, which have been herein described and illustrated to explain the nature of the subject matter, may be made by those skilled in the art within the principle and scope of the present subject matter as expressed in the appended claims.

The invention claimed is:

1. A probe, comprising:
  a mount configured to mate with a surface of an object to be measured;
  a plurality of holes extending through the mount; and
  a plurality of sense leads extending through the plurality of holes and configured to make contact with the surface of the object to be measured.

2. The probe of claim 1, further comprising a spring-loaded mechanism operably connected with the plurality of sense leads and configured to maintain the plurality of sense leads in electrical contact with the surface of the object to be measured.

3. The electric potential change probe of claim 1, further comprising a sensor electrically connected to the plurality of sense leads and configured to detect a change in electric potential.

4. The probe of claim 3, wherein the sensor is configured to detect a change in electric potential in an interior of the object to be measured.

5. The probe of claim 4, wherein the sensor is configured to detect a change in electric potential up to 300 mils below the surface of the object to be measured.

6. The probe of claim 1, wherein the sense leads are movable.

7. The probe of claim 6, wherein the sense leads are circumferentially movable.

8. The probe of claim 1, further comprising a position indicator configured to measure a position of the probe.

9. The probe of claim 1, wherein the mount is nonconductive.

10. The probe of claim 1, wherein the mount fits a contour of the surface of the object to be measured.

11. The probe of claim 10, wherein the mount is composed of additively manufactured plastic.

12. A method of measuring an interior of an object, comprising:
  extending a plurality of sense leads through a plurality of holes in a mount mated with an object to be measured;
  placing the plurality of sense leads on a surface of the object;
  passing a current into the object;
  sensing a change in electric potential in the interior of the object based on the passed current; and
  forming a computer-generated crack profile of the interior of the object based on the sensed change in electric potential.

13. The method of claim 12, further comprising the step of passing the current through the interior of the object.

14. The method of claim 12, further comprising the step of
  configuring the plurality of sense leads to make electrical contact with the surface of the object.

15. The method of claim 14, further comprising the step of fitting the mount with the surface of the object.

16. The method of claim 15, wherein the mount is composed of additively manufactured plastic.

17. The method of claim 12, further comprising the steps of:
- moving the plurality of sense leads across the surface of the object to different positions;
- recording in a non-transitory computer readable medium a plurality of sense lead positions;
- sensing a plurality of changes in electric potential in the interior of the object at a plurality of sense lead position; and
- forming the crack profile based on the plurality of sensed changes in electric potential.

18. The method of claim 17, further comprising the step of circumferentially moving the plurality of sense leads across the surface of the object to be measured.

19. The method of claim 12, further comprising the step of:
- placing the plurality of sense leads on the surface of the object opposite an opening of an interior crack of the object.

20. The method of claim 19, further comprising the steps of:
- moving the plurality of sense leads across the surface of the object to different positions;
- recording in a non-transitory computer readable medium a plurality of sense lead positions;
- sensing a plurality of changes in electric potential in the interior of the object at a plurality of sense lead positions; and
- forming the crack profile based on the plurality of sensed changes in electric potential.

* * * * *